July 16, 1929.  A. SIGNORINI ET AL  1,721,320
INTERNAL COMBUSTION ENGINE
Original Filed May 15, 1926
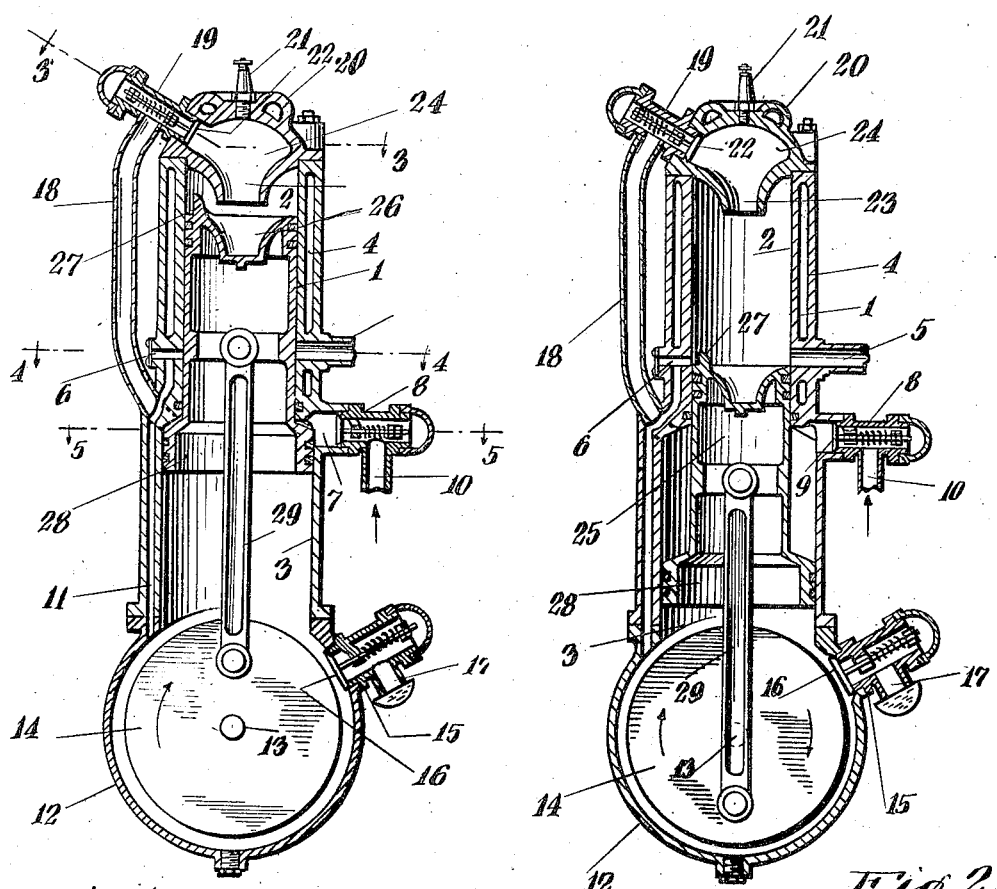
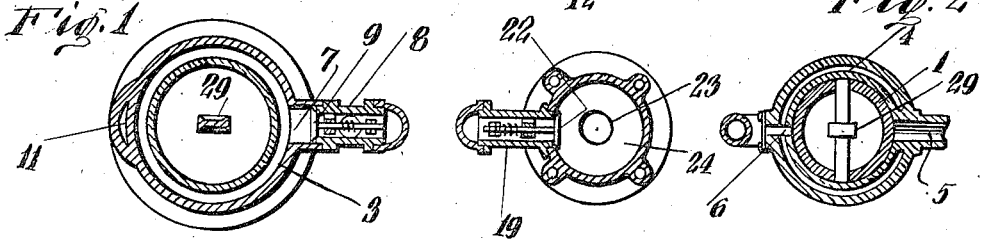
Inventor
Alberto Signorini
Giovanni Geloso
By their Attorney Patented July 16, 1929.

1,721,320

UNITED STATES PATENT OFFICE.

ALBERTO SIGNORINI, OF NEW YORK, AND GIOVANNI GELOSO, OF BROOKLYN, NEW YORK.

INTERNAL-COMBUSTION ENGINE.

Continuation of application Serial No. 109,319, filed May 15, 1926. This application filed January 18, 1928. Serial No. 247,760.

This invention relates to internal combustion engines and more particularly refers to an improved arrangement of combustion chamber adapted to improve the combustion and operating conditions of an engine of the compression type.

The primary object of the invention is to provide in an engine of the character specified, an improved arrangement of combustion chamber together with means for admitting an explosive mixture and air into said chamber, whereby the tendency of an explosive mixture to detonate is effectively checked by creating conditions causing a gradual and complete combustion to take place.

Another object of the invention is to provide in an engine of the character specified, a novel and improved type of combustion chamber, especially adapted for use in connection with engines of the two cycle type, together with means making it possible to effectively burn a greater quantity of fuel than would be possible in an engine of the ordinary type having a corresponding stroke and bore without detonation, and without the formation of carbon deposits.

A further object is to provide in an internal combustion engine of the two cycle type a cylinder head of a novel and improved design and means cooperating therewith, insuring a thorough scavenging effect in the cylinder after each explosion.

A still further object is to provide an internal combustion engine of the two cycle type of an improved design possessing in combination certain features and characteristics insuring smooth running and good operating efficiency of the engine, as well as a relatively high power generating capacity.

Other objects and advantages of the present invention will more fully appear as the description proceeds and will be set forth and claimed in the appended claims.

One of the important features of our present invention resides in a combustion chamber of a special design whereby a regulating action on the fuel combustion is automatically obtained due to the manner in which the explosive charge and the air assisting combustion are admitted to and distributed within the cylinder; so that by virtue of this arrangement, the necessity of correcting the chemical composition of the fuel used may be reduced or totally avoided.

Our improved arrangement is also responsible for the creation of thoroughly efficient scavenging conditions in the cylinder, and also affords means for retaining carbon deposits, if any are formed, away from the wearing surfaces of the cylinder and piston.

Our invention furthermore possesses certain additional advantages which will be pointed out in the course of the description.

Referring to the drawings:

Fig. 1 is a transversal vertical sectional view of the engine showing the piston at the end of its compression stroke;

Fig. 2 is a similar view showing the piston at the end of the firing and expansion stroke;

Fig. 3 is a transverse sectional view through the cylinder head of the engine, taken on the line 3—3 of Fig. 1;

Fig. 4 is a similar view taken on the line 4—4 of Fig. 1; and

Fig. 5 is a similar view taken on the line 5—5 of Fig. 1.

The engine comprises a cylinder 1 provided at one end with a relatively small bore 2 and at its opposite end with a relatively large bore 3. That end portion of the cylinder 1 which is provided with a bore 2 is surrounded by a cooling jacket 4. The cylinder is provided with an exhaust port 5 and with inlet ports 6 communicating at their inner ends with the bore 2. The ports 5 and 6 are preferably located at diametrically opposite sides of the cylinder and are disposed in the same horizontal plane. The cylinder is provided with a port 7 which communicates at its inner end with the upper end of the bore 3. A valve casing 8 is connected with the port 7 and houses a spring controlled valve member 9. The casing 8 is provided at its side with a nipple 10 which may be connected with a carburetor (not shown) in a usual manner. The cylinder 1 is further provided at its side wall with a duct 11 leading in from the larger end of the cylinder and which communicates at its upper end with the port 6.

The lower larger end of the cylinder 1 is closed by a crank casing 12. A shaft 13 is journaled in the casing 12 and a crank disk 14 is mounted upon the shaft 13 and housed within the casing 12. A valve casing 15 is mounted at the side of the crank casing 12 and disposed with its longitudinal dimension radially alined with the axis of the shaft 13, A spring controlled valve member 16 is housed in the casing 15 and the casing 15 is provided at its side with an inlet opening 17 through which atmospheric air may enter the casing 15 as will be hereinafter explained.

A pipe 18 is disposed externally of the cylinder 1 and is connected at its lower end with the larger bore 2 of the cylinder and at its upper end with a valve casing 19 which in turn is mounted upon a cylinder head 20 connected with the end of the cylinder 1 and closing the smaller bore 2 thereof. A spark plug 21 is located at the center of the head 20 and the valve casing 19 is provided with a spring controlled valve 22 which normally closes the passageway through the casing 19.

The head 20 is provided at its under side with a cone-shaped ajutage or nozzle 23 which extends into the smaller bore 2 of the cylinder 1. The head 20 is hollow thereby forming an interior firing chamber 24 and the inner ends of the casing 19 and the spark plug 21 enter the said chamber 24 or communicates therewith. The spark plug 21 is to be connected in a usual manner with a magneto or generator (not shown).

A piston 25 is slidably mounted in the cylinder 1. Said piston is hollow and closed at its upper end by a depressed wall forming a pocket 26. The piston is provided at its upper end and at the edge of the pocket with an upstanding lip 27 which is spaced from the periphery of the piston and arranged to move in a plane lying between the intake port 6 and the exhaust port 5. The body of the piston 25 is arranged to reciprocate in the smaller bore 2 of the cylinder. The piston 25 is provided at its lower end with a diametrically enlarged skirt 28 which is arranged to reciprocate in the larger bore 3 of the cylinder 1 and which fits snugly therein.

A connecting rod 29 is pivotally connected at its upper end with the piston 25 and pivotally connected at its lower end with the crank disc 14 at a point eccentrically thereof.

The operation of the engine is as follows. Assuming that the engine is started with its parts in the positions as shown in Fig. 1 of the drawings. Atmospheric air which has previously been received in the larger bore of the cylinder 1 is compressed by the downward movement of the piston 25 and this compressed air is forced up through the duct 11 into the jacket 4. At the same time the skirt portion 28 of the piston 25 moves away from the mixture port 7 and the mixture is drawn into the upper portions of the bore 3 through the casing and the nipple 10 thereof.

When the piston 25 arrives at the lower end of its stroke the ports 6 and 5 are uncovered. The compressed air then passes through the ports 6 into the smaller bore 2 of the cylinder 1. As the skirt portion 28 moves in an upward direction with the piston 25, the mixture which has been drawn into the bore 3 is compressed in the upper portion of the said bore and forced through the pipe 18 and the valve casing 19 into the firing chamber 24 of the head 20. At the same time the piston 25 moves in an upward direction and the air which has been admitted into the bore 2 of the cylinder 1 is compressed in the upper portion of the bore 2 by the walls of the pocket 26 and the ajutage 23 of the head 20.

When the piston 25 arrives at the upper end of its stroke the mixture in the firing chamber 24 is ignited by the spark plug 21 and thus an explosion occurs in the firing chamber 24.

It will be observed that during the compression stroke of the piston, both the mixture admitted to the firing chamber 24 and the air previously admitted into the bore 2 of the cylinder are subjected to pressure simultaneously at both ends, the individual pressures thus exerted being preferably of the same value, due to equal displacement of equivalent surfaces; so that the turbulence of the mixture is thereby diminished; consequently less tendency is developed in the mixture to mix with the air within bore 2, their intermingling being also impeded in view of the rapidity of the movement of the piston.

Furthermore, it will be noted that the converging walls of the ajutage 23, by inwardly projecting as they do within the bore 2, virtually form an annular chamber at the top of said bore 2 within which compressed air becomes imprisoned by the action of the piston making it physically impossible for said air to intermingle with the mixture within chamber 24.

By virtue of the arrangement described, at the end of the compression stroke as illustrated in Fig. 1, the combustion chamber becomes subdivided into two intercommunicating chambers, one of which 24 is the firing chamber, and the other one, delimited by the outer surface of the ajutage 23 and by the upper surface of the piston, we will call the expansion chamber. The expansion chamber is filled with air under pressure, which by not being mixed with the combustible particles of the fuel mixture will prevent the possibility of the process of combustion acquiring an excessive velocity.

At first, when the firing occurs, and the expanding gases move rapidly through the ajutage 23 and enter the plenum of compressed air in the upper end of the bore 2 (which we have called the expansion chamber), said air acts as a shock absorbing cushion, interposed between the exploding mixture and the cylinder and piston walls; and subsequently said air gradually supplies oxygen to the unburned portions of the fuel mixture, thus delaying and rendering more gradual and progressive the combustion of the mixture as a whole.

As a result no excessive maximum pressures are created within the cylinder but a relatively high average pressure is produced instead, throughout a period of combustion which is longer than it would be under usually normal conditions.

By thus prolonging the period of combustion of the mixture, other advantages are obtained due to the fact that no excessive temperatures are created and that the knock is practically eliminated.

Another advantage is that the higher pressures due to combustion, as against those subsequently developed during expansion, are still being exerted when the torque of the piston rod has acquired a fairly high value, and a smoother running and more uniform distribution of stresses thereby results.

Still another advantage is the improved combustion due to the fact that the mouth of the ajutage is surrounded by air on all sides this giving a chance to the unburnt fractions to mix with an abundant supply of oxygen as they issue through the mouth of ajutage 23.

Still another advantage is that due to the isolation of the firing chamber from the piston chamber, the higher temperatures created during the initial period of expansion are confined to parts of the cylinder which are not directly in contact with the moving parts; less binding or frictional resistance due to their expansion are therefore experienced.

Still another result which is due to the peculiar arrangement of the combustion chamber and piston is the impossibility of the formation of carbon deposits upon the walls of the cylinder. Due to the improved combustion conditions, complete combustion as a rule results, but under certain conditions, it is possible that the combustion may not be quite as complete as during normal operation.

In this case carbon deposits if any, will be accumulated in the cavity which is provided in the center of the piston and consequently no carbon due to incomplete combustion of the fuel can reach the rings of the piston and wear the inner surface of the cylinder.

Due to the expansion of the gases the piston 25 is positively and quickly moved upon its downward stroke and the operation above described is repeated. As the piston moves in its upward stroke atmospheric air is drawn into the cylinder at the rear of the piston and the crank casing through the valve casing 15 and the inlet openings 17 thereof. When the piston 25 is about to reach the lower end of its stroke in consequence of an explosion having previously taken place in the firing chamber 24, port 5 begins to be uncovered, and when said piston actually reaches the end of its stroke both ports 5 and 6 are uncovered by the piston and the compressed air enters the bore 2 of the cylinder 1 through the port 6 and the exhaust or burnt gases pass out of the bore 2 of the cylinder 1 through the exhaust ports 5. In that the lip 27 is interposed between the ports 6 and 5 the compressed air is deflected in an upward direction in the bore 2 and in striking the curved outer surface of ajutage 23 it is distributed all around the upper part of bore 2 and is then once more deflected downwardly by said curved surface.

Consequently, the said bore is completely scavenged by the influx of the compressed air and the burnt gases are purged through the exhaust ports 5 leaving the upper portion of the bore 2 filled with a plenum of atmospheric air which is further compressed upon the upward movement of the piston as hereinbefore described. The compressed mixture which comes from the carburetor is subsequently exploded into the compressed air in the upper portion of the cylinder, as stated.

It will be observed that when the air entering the bore 2 of the cylinder through port 6 is deflected upwardly by lip 27 and then downwardly by the outer surface of the ajutage 23, said air exerts a suction around the mouth of said ajutage and draws out whatever amount of exhaust gas may still remain in the firing chamber, thus insuring thorough scavenging of those parts of the combustion chamber which are not reached by the air direct.

The arrangement described is particularly suitable for use in engines of the two cycle type, but it is obvious that with suitable modifications, the same type of combustion chamber may be used in engines of the four cycle type; since the regulating action upon combustion due to the separation of the combustion chamber into a firing chamber and a separate air or expansion chamber can be obtained at the time of the expansion, irrespective of whether the engine is of the two cycle or of the four cycle type.

The various details of our invention may vary to a certain extent from those shown, without departing from the inventive idea, and the drawings are therefore to be understood as being intended for illustrative purposes only and not in a limiting sense; we accordingly reserve ourselves the right to carry our invention into practice in all those ways and manners which may enter fairly, into the scope of the appended claims.

We claim:

1. The method of operating an internal combustion engine of the type where a combustible gas mixture is admitted to the cylinder, which consists in admitting air within the cylinder from the opposite end, previous to the compression of said charge, simultaneously subjecting said gas mixture and air to gradually increasing pressure, while preventing intermingling of said air with said charge, then firing said charge while containing a quantity of oxygen insufficient for its complete combustion, thus causing said air to absorb the initial force of the explosion, and to delay the combustion of said mixture.

2. The method of operating an internal combustion engine of the type where a combustible gas mixture is admitted to the cylinder, which consists in positively isolating the explosive mixture while containing a quantity of oxygen insufficient for its complete combustion, from a part of the air supplied for its combustion, firing the charge while in this isolated condition, and discharging the burning charge into said air in order to complete its combustion and prolong the period of combustion.

3. The method of operating an internal combustion engine of the type where a combustible gas mixture is admitted to the cylinder, which consists in isolating the explosive mixture while containing a quantity of oxygen insufficient for its complete combustion, from a part of the air supplied for its combustion, admitting said air within the cylinder from the opposite end, previous to the compression of said charge, simultaneously subjecting said gas mixture and air to gradually increasing pressure from two opposite ends, while preventing intermingling of said air with said charge, firing the mixture while in this isolated condition, and discharging the burning mixture into said air in order to complete the combustion of said mixture and prolong its period of combustion.

4. In an internal combustion engine of the character specified, the combination, with a cylinder comprising an expansion chamber, of a separate ignition chamber having a single opening communicating therewith, means for supplying a fuel-air mixture to said ignition chamber, at substantially atmospheric pressure, means for supplying air also at substantially atmospheric pressure to the expansion chamber, and means for compressing said air and mixture within their respective chambers, causing said two gaseous bodies to press against each other in opposite directions across said opening, previous to the ignition of said mixture.

5. In an internal combustion engine of the character specified, the combination with a cylinder comprising an expansion chamber, of a separate ignition chamber having a single opening communicating therewith, means for supplying a fuel-air mixture at substantially atmospheric pressure to said ignition chamber, means for supplying air also at substantially atmospheric pressure to said expansion chamber, and means for simultaneously compressing said mixture and air from two opposite directions, causing said two gaseous bodies to press against each other in opposite directions across said opening.

6. In an internal combustion engine of the character specified, the combination with a cylinder comprising an expansion chamber, an ignition chamber, and means for supplying a fuel-air mixture to said ignition chamber, of means for inwardly extending said ignition chamber, causing it to project within and to communicate with said expansion chamber, and means for supplying and compressing air within said expansion chamber, previous to the ignition of said mixture.

7. In an internal combustion engine of the character specified, the combination with a cylinder comprising an expansion chamber, an ignition chamber, and means for supplying a fuel-air mixture to said ignition chamber, of a frusto-conical extension for said ignition chamber, causing it to project within and to communicate with said expansion chamber, forming an annular chamber at the outer end of said expansion chamber, and means cooperating with said fuel-air mixture supplying means, for supplying and compressing air within said expansion and annular chambers, previous to the ignition of said mixture.

8. In an internal combustion engine of the charcter specified, the combination with a cylinder comprising an expansion chamber, and an ignition chamber, of a frusto-conical extension for said ignition chamber, causing it to project within and to communicate with said expansion chamber, forming an annular chamber at the outer end of said expansion chamber, means for supplying and compressing a fuel-air mixture within said ignition chamber, and means cooperating therewith, for simultaneously supplying and compressing air within said expansion and annular chambers, previous to the ignition of said mixture.

9. In an internal combustion engine of the character specified, the combination with a cylinder comprising an expansion chamber, an ignition chamber, and means for supplying a fuel-air mixture to said ignition chamber, of means for supplying a scavenging agent to said expansion chamber, and a tapering nozzle extension for said ignition chamber, causing it to project within and to communicate with said expansion chamber, said extension having an inwardly curved outer surface adapted to inwardly deflect a jet of scavenging agent directed against said surface.

10. In an internal combustion engine of the character specified, the combination with a cylinder comprising an expansion chamber, an ignition chamber, and means for supplying a fuel-air mixture to said ignition chamber, of a nozzle inwardly extending from said ignition chamber, causing it to project within and to communicate with said expansion chamber, means for supplying and compressing air within said expansion chamber, previous to the ignition of said mixture, and a reciprocating piston within said expansion chamber, having an inwardly depressed end surface, forming an extension of said expansion chamber.

11. In an internal combustion engine of the character specified, the combination with a cylinder comprising an expansion chamber, of a larger diameter chamber coaxial therewith, a differential piston reciprocating within said two chambers, means for admitting a fuel-air mixture to said larger diameter chamber, a closed crankcase at the rear of said piston, means for admitting air to said crankcase, a valve controlled connection between said crankcase and said expansion chamber, exhaust means for said expansion chamber, an ignition chamber, a valve controlled connection between said larger diameter chamber and said ignition chamber, and an extension for said ignition chamber, causing it to project within and to communicate with said expansion chamber, forming an annular chamber at the outer end of said expansion chamber, preventing the air in the expansion chamber from mixing with the fuel mixture in the ignition chamber at the end of the compression stroke.

12. In an internal combustion engine of the character specified, the combination with a cylinder comprising an expansion chamber, of a larger diameter chamber coaxial therewith, a differential piston reciprocating within said two chambers, means for admitting a fuel-air mixture to said larger diameter chamber, a closed crankcase at the rear of said piston, means for admitting air to said crankcase, a valve controlled connection between said crankcase and said expansion chamber, exhaust means for said expansion chamber, an ignition chamber, a valve controlled connection between said larger diameter and said ignition chamber, means associated with said piston for directing air admitted to said expansion chamber towards the outer end thereof, and a frusto-conical extension for said ignition chamber, causing it to project within and to communicate with said expansion chamber, forming an annular chamber at the outer end thereof, said extension having an inwardly curved outer surface adapted to inwardly deflect said air.

13. In an internal combustion engine of the character specified, the combination with a cylinder comprising an expansion chamber, of a larger diameter chamber coaxial therewith, a differential piston reciprocating within said two chambers, means for admitting a fuel-air mixture to said larger diameter chamber, a closed crankcase at the rear of said piston, means for admitting air to said crankcase, a valve controlled connection between said crankcase and said expansion chamber, exhaust means for said expansion chamber, an ignition chamber, a valve controlled connection between said larger diameter and said ignition chamber, means associated with said piston for directing air admitted to said expansion chamber towards the outer end thereof, a frusto-conical extension for said ignition chamber, causing it to project within and to communicate with said expansion chamber, forming an annular chamber at the outer end thereof, said extension having an inwardly curved outer surface adapted to inwardly deflect said air, and an inwardly extending cavity at the outer end of said piston, forming an extension of said expansion chamber, increasing the capacity thereof at the end of the compression stroke of said piston.

14. In an internal combustion engine a cylinder having intake and exhaust ports, a head closing one end of the cylinder, said head being hollow and having an ajutage which enters the bore of the cylinder, a valve controlled pipe connecting the intermediate portion of the cylinder with the interior of the head, said cylinder having at an intermediate point a port for admitting a scavenging agent into the cylinder, a piston mounted for reciprocatory movement in the cylinder, forming a compound air chamber at the outer end of the bore in the cylinder at the end of its compression stroke, said piston being hollow and having one end permanently closed by a wall provided with a cavity forming an extension of said compressed air chamber, and the side walls of the ajutage being inclined to form a tapering nozzle extending within said chamber.

ALBERTO SIGNORINI.
GIOVANNI GELOSO.